United States Patent [19]
Altman

[11] Patent Number: 5,520,010
[45] Date of Patent: May 28, 1996

[54] APPARATUS FOR FORMING STACKING SURFACES ON FLEXIBLE FILM FREEZER BAGS

[76] Inventor: Francis M. Altman, R-1, Box 41, Johnsonville, S.C. 29555

[21] Appl. No.: 63,311

[22] Filed: May 19, 1993

[51] Int. Cl.⁶ .................................................... F25C 5/14
[52] U.S. Cl. ..................... 62/341; 100/195; 264/297.4; 425/328
[58] Field of Search ..................... 62/60, 530, 341; 53/440; 211/59.4; 411/522; 264/28, 297.4; 100/194, 195; 425/328, 329

[56] References Cited

U.S. PATENT DOCUMENTS

| | | | |
|---|---|---|---|
| 1,509,850 | 9/1924 | Thompson et al. | |
| 1,710,386 | 4/1929 | Taylor | 62/60 X |
| 1,936,814 | 11/1933 | Wetta, Sr. | 100/57 |
| 1,983,768 | 12/1934 | Norton | 62/104 |
| 2,114,530 | 4/1938 | Gorton, Jr. | 99/174 |
| 2,443,684 | 6/1948 | Lazarus | 211/59.4 X |
| 2,528,449 | 10/1950 | Norton | 62/530 X |
| 2,917,180 | 12/1959 | Snyder | 211/59.4 |
| 2,935,205 | 5/1960 | Higgin | 211/59.4 X |
| 2,966,041 | 12/1960 | Zearfoss, Jr. et al. | 62/530 X |
| 3,464,833 | 9/1969 | Mayo | 99/174 |
| 3,615,720 | 10/1971 | Knutrud | 99/195 |
| 4,193,351 | 3/1980 | Belokin, Jr. | 211/59.4 X |
| 4,706,822 | 11/1987 | Remp, Jr. et al. | 211/59.4 |
| 4,728,521 | 3/1988 | Mitchell | 426/119 |
| 4,801,024 | 1/1989 | Flum et al. | 211/59.4 |
| 4,903,494 | 2/1990 | Wigley | 62/60 |
| 5,197,841 | 3/1993 | Tanaka | 411/522 |

*Primary Examiner*—William E. Tapolcai
*Attorney, Agent, or Firm*—Nies, Kurz, Bergert & Tamburro

[57] ABSTRACT

Apparatus for forming substantially parallel upper and lower surfaces on flexible freezer bags containing freezable materials so that upon freezing the packages are readily stackable one above another. The apparatus includes a rigid base plate having a planar top surface, a plurality of substantially parallel, spaced column members extending upwardly from the top surface of the base plate, and a plurality of rigid, intermediate plate members adapted to be slidably carried along the surfaces of the column members so that the upper and lower surfaces of the intermediate plate members are substantially parallel with the planar top surface of the base plate. Bags having fluid or semi-solid, flexible contents to be frozen are positioned one above another between respective intermediate plate members for freezing. After freezing the bags have opposed, parallel upper and lower surfaces that facilitate stacking the bags on a horizontal freezer shelf.

13 Claims, 1 Drawing Sheet

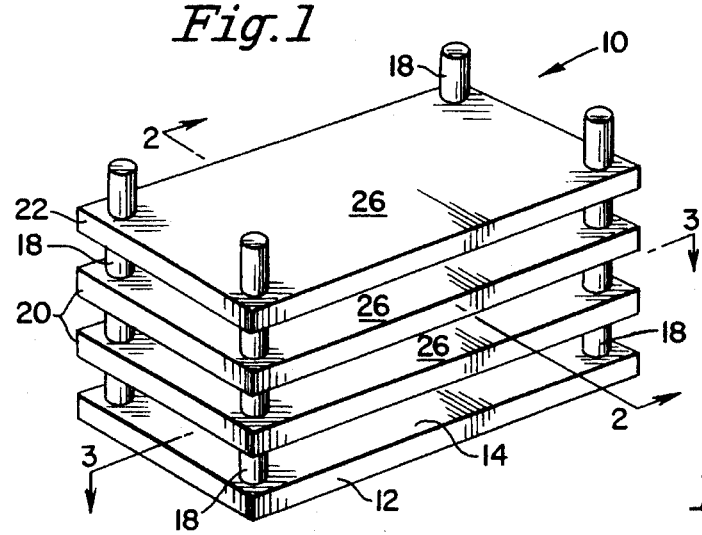
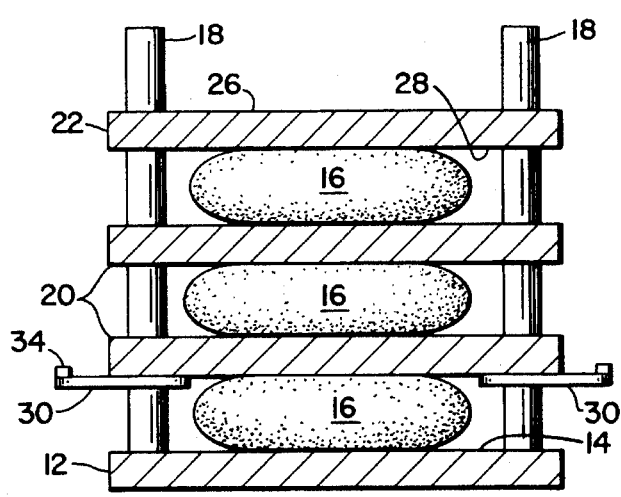
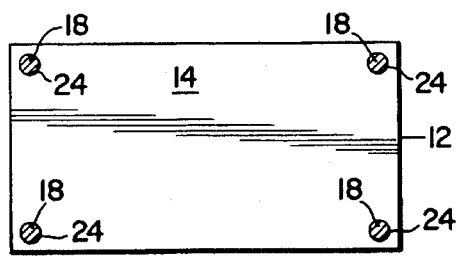
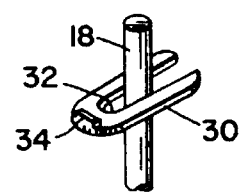
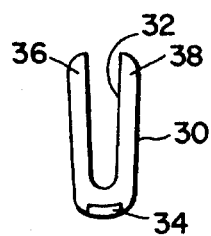
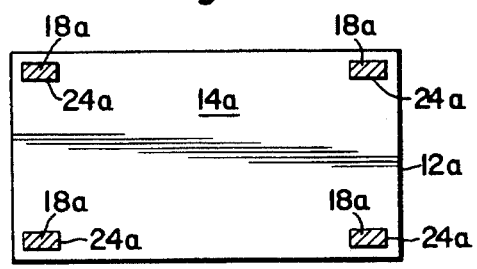

APPARATUS FOR FORMING STACKING SURFACES ON FLEXIBLE FILM FREEZER BAGS

BACKGROUND OF THE INVENTION

1. Field of the Invention

The present invention relates to forming apparatus for forming substantially flat upper and lower stacking surfaces on flexible freezer bags containing freezable goods. More particularly, the present invention relates to forming apparatus that facilitates the simultaneous formation of substantially parallel upper and lower stacking surfaces on a plurality of flexible freezer bags containing freezable goods.

2. Description of the Related Art

It is common practice to package in flexible, plastic freezer bags food items such as fish, chicken parts, vegetables, fruits, microwaveable entrees, and the like, to be frozen for later use. However, because of the flexible nature of the freezer bags themselves, and also because of the flexible nature of the contents of the bags, which often contain some fluid as well as solid or semi-solid materials, the surfaces of the bags are often irregular and non-planar after freezing. As a result, the stacking in neat columns of several such irregularly-shaped bags on horizontally disposed freezer shelves or racks is rendered difficult, and frequently the packages are randomly distributed within the freezer. That stacking difficulty exists even though some of the frozen packages might have substantially planar lower surfaces.

Consequently, packages containing fish and other frozen foods frequently include rectangular outer cartons made from paperboard, and the like, within which the irregularly-shaped frozen bags are placed, to provide planar upper and lower surfaces for facilitating stacking of the packages. The provision of such outer cartons involves additional expense, and it is a solution that is not readily available to the individual who does his own freezing in his home, such as a fisherman.

Several different structures of apparatus have been proposed to form food items, such as fish, in block form to thereby facilitate stacking. For example, in U.S. Pat. No. 3,615,720, which issued on. Oct. 26, 1971, to Leif Brudal Knutred, there is shown an evacuable chamber within which a substantially rectangular frame member is provided, into which a cardboard box and the fish or other items to be frozen are placed. Thereafter a plate is positioned in overlying relationship-with the box and fish, and pressure is applied either pneumatically or by means of a pair of coil springs, to force the plate against the upper surface of the box and contents and thereby provide a flat upper surface upon freezing of the contents of the package. However, the disclosed device appears to be intended for forming individual packages one at a time in block form, which is very time consuming when a plurality of such packages are desired to be frozen.

In U.S. Pat. No. 1,983,768, which issued on Dec. 11, 1934, to K. B. Norton, there is shown a forming mold including upper and lower plate members between the fish or other goods are to be positioned for freezing. The plate members are drawn toward each other by means of handwheel-operated clamping bolts to provide a predetermined pressure on the goods to be frozen. A Cartons is used for packaging the goods, and pressure is applied to the carton and to the goods to eliminate air spaces from between the individual items to be frozen.

In U.S. Pat. No. 3,464,833, which issued on Sep. 2, 1969, to Fletcher Mayo, there is shown a forming mold including a substantially rectangular frame within which a carton containing the materials to be frozen is positioned. Pressure is applied to the top of the package by a platen member that serves to compress the material within the container as the material is being frozen.

Although the prior art devices are generally satisfactory, they do not permit the simultaneous freezing in stacked form of a plurality of flexible packages of edible materials contained within individual plastic bags to permit the bags after freezing to be stacked one upon the other for convenient, stable, and efficient storage.

SUMMARY OF THE INVENTION

Briefly stated, in accordance with one aspect of the present invention, a forming device is provided for simultaneously forming substantially parallel stacking surfaces on a plurality of packages containing freezable materials that are flexible at room temperature. The device includes a base plate having a planar top surface, and a plurality of substantially parallel, spaced column members extending upwardly from the top surface of the base plate. A plurality of intermediate plate members is provided, the plate members having substantially parallel planar upper and lower surfaces, and a plurality of apertures extending through the intermediate plate members, the apertures having a cross section and a spacing corresponding with that of the column members, so that the intermediate plate members can be slidably positioned along the column members to a desired elevation above the base plate. In use the device includes a plurality of flexible packages of freezable materials with individual packages positioned between adjacent plate members and having package surfaces in contact with respective opposed planar surfaces of adjacent plate members to define respective upper and lower stacking surfaces on the package upon freezing of the material within the packages.

BRIEF DESCRIPTION OF THE DRAWINGS

FIG. 1 is a perspective view of a forming device in accordance with the present invention.

FIG. 2 is a cross-sectional, elevational view of the device shown in FIG. 1, taken along the line 2—2 thereof.

FIG. 3 is a cross-sectional view of the device shown in FIG. 1, taken along the line 3—3 thereof.

FIG. 4 is a cross-sectional view similar to FIG. 3, showing the column members having a rectangular cross section.

FIG. 5 is a fragmentary perspective view showing a column member with a positioning clip attached thereto.

FIG. 6 is a plan view of one form of positioning clip that can be used with the present invention.

DESCRIPTION OF THE PREFERRED EMBODIMENTS

Referring now to the drawings, and particularly to FIGS. 1 and 2 thereof, there is shown a forming device 10 in accordance with the present invention. Device 10 includes a base plate 12, which can be of rectangular form, and which preferably has a flat, substantially planar upper surface 14 to support a flexible, product-containing package 16, which will be hereinafter described in more detail.

Secured to and extending upwardly from upper surface 14 of base plate 12 is a plurality of column members 18 that have a uniform transverse cross section, and that are disposed perpendicularly relative to upper surface 14, with their respective longitudinal axes parallel with each other. Column members 18 are spaced from each other, and when base plate 12 is rectangular, four column members 18 are provided, each preferably positioned adjacent a corner of the base plate 12. The axial length of each of column members 18 is sufficient to exceed the total height dimensions of the number of flexible packages 16 intended to be frozen, and is also sufficient to accommodate a plurality of intermediate plate members 20. As shown in FIG. 2, the height is sufficient to extend beyond the total of three packages 16 and also two intermediate plate members 20, between adjacent packages 16, along with an upper plate member 22 above the uppermost surface of uppermost package 16.

Each of intermediate plate members 20 can also be of the same general form, such as a rectangular form, similar to the form of base plate 12. Each intermediate plate member 20, as well as upper plate member 22, includes a plurality of apertures 24 that extend through the entire plate member from the upper surface 26 to the lower surface 28 thereof. Each of apertures 24 has a cross-sectional shape and area to correspond with the cross-sectional shape and area of respective column members 18. In that connection, it is desired that intermediate plate members 20 and upper plate member 22 be freely slidable along the outer surfaces of column members 18, so that the plate members can be easily placed in position and removed when assembling and when disassembling the device. In that connection, it is preferred that the fit between apertures 24 in the plate members 20 and 22, and the surfaces of column members 18 be a close fit, to prevent tilting of surfaces 26 and 28 relative to a horizontal plane. If there is excessive clearance between those elements, the plate members can be positioned in cocked relationship relative to adjacent plate members, which is undesirable because it adversely affects the height to which frozen packages can be stacked. Plate members 20 and 22 also preferably have sufficient rigidity so that they are not deflected by the packages to be positioned therebetween, either initially, before freezing of the contents of the packages, or after freezing.

Base plate 12 and intermediate plate members can be made from a variety of rigid materials, such as wood, plastic or metal. In that regard, metal plate members provide the desired rigidity, and also provide greater thermal conductivity to reduce freezing time. For lighter weight consistent with the desired rigidity and with the improved thermal conductivity, aluminum or aluminum alloy plates can be used.

As illustrated in FIG. 3, column members 18 have circular cross sections, and they are positioned slightly inwardly of the respective corners of base plate 12. FIG. 4 shows an embodiment in which column members 18a have rectangular cross sections.

Referring now to FIGS. 5 and 6, there is shown in FIG. 5 a fragmentary elevation of a column member 18, and a flat positioning clip 30 that is adapted to engage the outer surface of the column member. Clip 30 is of a U-shape in plan view, and includes an inner slot 32 defined by straight sides that diverge outwardly, as seen more clearly in exaggerated form in FIG. 6. Positioning clip 30 also preferably includes a gripping tab 34 that can extend substantially perpendicularly relative to the major surfaces of the clip, as best seen in FIG. 5, to facilitate handling and use of the clip.

Clip 30 is a flat, plate-like member that is sufficiently thin to provide some degree of flexibility so that legs 36 and 38 of the clip can engage and be retained on the outer surface of the column member, in the position shown in FIG. 5.

In operation, packages to be frozen are preferably in the form of flexible plastic bags 16 that are formed from plastic films and that contain semi-solid or liquid materials, or both. The bags are sealed, either by heat sealing each of the edges of superposed plastic sheets, or by providing along one edge of the bag a zipper-type closure (not shown), so that the contents are securely retained within the bag.

The device in accordance with the present invention includes a base plate 12 having columns 18, but initially it does not include the several intermediate plate members 20. One of the flexible packages 16 to be frozen is placed on upper surface 14 of base plate 12 to assume the position of the lowermost bag 16 as shown in FIG. 2.

After the first bag 16 is placed upon upper surface 14 of base plate 12, a first intermediate plate member 20 is positioned above column members 18 so that apertures 24 are aligned with respective corresponding column members 18. Plate member 20 is slidably moved downwardly along column members 18 until lower surface 28 of the plate member is in contact with the uppermost surface of bag 16 to be frozen. A positioning clip 30 can then be slid laterally onto each of column members 18, immediately below and in contact with lower surface 28 of the lowermost intermediate plate member 20, so that the uppermost surface of positioning clip 30 is in abutting relationship with lower surface 28 of lowermost plate member 20, as shown in FIG. 2. Clip 30 thus vertically positions intermediate plate member 20 and maintains it in a level, horizontal orientation, so that the upper surface of lowermost bag 16 is flat, horizontal, and parallel with the lower surface thereof.

A second bag 16 is then placed upon the uppermost surface 26 of the lowermost intermediate plate member 20, and the next intermediate plate member 20 is installed in the same manner. The process is repeated until the desired number of bags are in position.

After the last and uppermost bag 16 has been placed in position, an upper plate member 22 is placed in overlying and in contacting relationship with the uppermost bag 16. Thus, each of the bags 16 has upper and lower surfaces that are in contact with respective planar surfaces of a plate member, or, in the case of the lowermost package, having its lowermost surface in contact with upper surface 14 of base plate 12 and having its uppermost surface in contact with lower surface 28 of an intermediate plate member 20.

The entire assembly can then be transported to and placed within a freezer so that the contents of the bags can be frozen. Because intermediate plate members 20 are capable of sliding movement along the outer surfaces of column members 18 if a sufficient force is applied to a plate member, should the contents of the bags expand slightly upon freezing, each of the intermediate plate members can move upwardly by the amount of the vertical expansion, and uppermost plate member 22 will move upwardly along column members 18 by the total amount of expansion that occurs. However, because of the weights of the respective intermediate plate members, some degree of pressure will be maintained on each of the bags by the plate members, so that each of the plate members maintains contact with the respective bags to provide planar, substantially parallel upper and lower surfaces on the bags after freezing has occurred.

After the contents of the packages are frozen, the positioning clips are removed and the upper and the several intermediate plate members are also removed, sequentially, to permit the frozen bags to be removed from the device and stacked one upon the other in a freezer until the bags are desired to be removed for use.

If, after freezing, a bag is removed from the freezer for use and only a part of the contents of the bag is consumed, the remainder, or leftovers, can be refrozen by using a pair of plates, one serving as a base plate and the second as a top plate, to provide flat, planar stacking surfaces on the partially filled bag. Such plates for leftovers can be used without the base plate and columns, and therefore the plates need not have the positioning apertures that are included in the plates intended for use with base plate 12 shown in FIG. 1.

It will be apparent that the present invention provides distinct advantages over the prior art devices in that it permits the simultaneous freezing of a plurality of flexible bag packages to provide stacking surfaces on each of the individual packages.

Although particular embodiments of the present invention have been illustrated and described, it will be apparent to those skilled in the art that various changes and modifications can be made without departing from the spirit of the present invention. Accordingly, it is intended to be encompassed within the appended claims all such changes and modifications that fall within the scope of the present invention.

What is claimed is:

1. In combination, a plurality of sealed plastic bags that are flexible at room temperature and that contain freezable materials, and forming apparatus for simultaneously forming substantially parallel upper and lower stacking surfaces on the sealed plastic bags, comprising:
   a. a rigid base plate member having a flat top surface;
   b. a plurality of substantially parallel, spaced column members secured to and extending upwardly from the top surface of the base plate member;
   c. a plurality of rigid intermediate plate members having substantially parallel flat upper and lower surfaces and a plurality of apertures equal in number with the column members and extending through the intermediate plate members, the apertures having a cross section and a spacing corresponding with those of the column members so that the intermediate plate members can be slidably moved in an axial direction along the column members to a desired location above the base plate member, the intermediate plate members and the base plate member each being free of projections on their respective opposed flat surfaces; and
   d. individual sealed plastic bags of freezable materials positioned between adjacent plate members with a pair of opposed outer surfaces of the packages contacting respective opposed flat surfaces of adjacent plate members to define a pair of respective substantially flat and substantially parallel rigid upper and lower stacking surfaces on each of the plastic bags upon freezing of the material contained within the bags while remaining surfaces of the plastic bags are unconfined by the forming apparatus, to permit the packages after freezing and after removal from the stacking apparatus to be stacked one upon another with respective stacking surfaces in opposed, contacting relationship.

2. A combination in accordance with claim 1 wherein the base plate member and the intermediate plate members are rectangular.

3. A combination in accordance with claim 1 herein the column members have a circular cross section.

4. A combination in accordance with claim 1 wherein the column members have a rectangular cross section.

5. A combination in accordance with claim 1 wherein the intermediate plate members have a sufficient thickness to prevent substantial tiliing of the plate members relative to the base plate member top surface and to maintain the plate members substantially parallel with each other when carried by the column members.

6. A combination in accordance with claim 1 wherein the base plate member and the intermediate plate members are metallic.

7. A combination in accordance with claim 6 wherein the metallic material is an aluminum alloy.

8. A combination in accordance with claim 1 including a plurality of positioning clips adapted to engage with outer surfaces of the column members for defining stops on the column members to position an intermediate plate member at a desired position along the column members.

9. In combination, a plurality of flexible packages that are flexible at room temperature and that contain freezable materials, and forming apparatus for simultaneously forming substantially parallel stacking surfaces on the flexible packages, comprising:
   a. a rigid base plate member having a flat top surface;
   b. a plurality of substantially parallel, spaced column members secured to and extending upwardly from the top surface of the base plate member;
   c. a plurality of rigid intermediate plate members having substantially parallel flat upper and lower surfaces and a plurality of apertures equal in number with the column members and extending through the intermediate plate members, the apertures having a cross section and a spacing corresponding with those of the column members so that the intermediate plate members can be slidably moved in an axial direction along the column members to a desired location above the base plate member; and
   d. individual flexible packages of freezable materials positioned between adjacent plate members with opposed outer surfaces of the packages contacting respective opposed flat surfaces of adjacent plate members to define respective substantially flat and substantially parallel rigid upper and lower stacking surfaces on the packages upon freezing of the material contained within the packages, to permit the packages after freezing and after removal from the stacking apparatus to be stacked one upon another with respective stacking surfaces in opposed, contacting relationship, the apparatus including a plurality of positioning clips adapted to engage with outer surfaces of the column members for defining stops on the column members to position an intermediate plate member at a desired position along the column members, wherein the positioning clips are flat and include a U-shaped opening defining a tapered engagement slot for engaging the outer surfaces of the column members.

10. A combination in accordance with claim 9 wherein the positioning clips include tab members at a closed end of the engagement slot.

11. A combination in accordance with claim 10 wherein the tab members extend at an angle from flat major surfaces of the clip.

12. A combination in accordance with claim 10 wherein the positioning clips are thin, rigid, plate-like elements.

13. In combination, a plurality of sealed plastic bags that are flexible at room temperature and that contain freezable materials, and forming apparatus for simultaneously forming substantially parallel upper and lower stacking surfaces on the sealed plastic bags, comprising:

a. a rigid base plate member having a flat top surface;

b. at least one column member secured to and extending upwardly from the top surface of the base plate member;

c. a plurality of rigid intermediate plate members having substantially parallel flat upper and lower surfaces and at least one aperture extending through the intermediate plate members, the at least one aperture having a cross section corresponding with that of the at least one column member so that the intermediate plate members can each be slidably moved in an axial direction along the at least one column member to a desired elevation above the base plate member, wherein the intermediate plate members are received on the at least one column member to prevent substantial tilting of the upper and lower surfaces of the respective intermediate plate members relative to the base plate member top surface, the intermediate plate members and the base plate member each being free of projections on their respective opposed flat surfaces; and d. individual sealed plastic bags containing freezable materials that are flexible at normal ambient temperature, the packages positioned between adjacent plate members with a pair of opposed outer surfaces of the packages contacting respective flat surfaces of adjacent plate members to define a pair of respective substantially flat and substantially parallel rigid upper and lower stacking surfaces on each of the plastic bags while remaining surfaces of the plastic bags are unconfined by the forming apparatus, so that after freezing and after removal from the forming apparatus formed plastic bags can be stacked one upon another when respective stacking surfaces of adjacent packages are placed in opposed, contacting relationship.

* * * * *